(12) United States Patent
Tian

(10) Patent No.: US 10,795,412 B2
(45) Date of Patent: Oct. 6, 2020

(54) WRIST DEVICES AND WRIST STRAP ASSEMBLIES THEREOF

(71) Applicant: YUNGU (GU'AN) TECHNOLOGY CO., LTD., Langfang (CN)

(72) Inventor: Wei Tian, Langfang (CN)

(73) Assignee: YUNGU (GU'AN) TECHNOLOGY CO., LTD., Langfang (CN)

( * ) Notice: Subject to any disclaimer, the term of this patent is extended or adjusted under 35 U.S.C. 154(b) by 0 days.

(21) Appl. No.: 16/508,694

(22) Filed: Jul. 11, 2019

(65) Prior Publication Data

US 2019/0332144 A1 Oct. 31, 2019

Related U.S. Application Data

(63) Continuation of application No. PCT/CN2018/096732, filed on Jul. 24, 2018.

(30) Foreign Application Priority Data

Apr. 9, 2018 (CN) .................... 2018 2 0494730 U

(51) Int. Cl.
*A44C 5/00* (2006.01)
*G04G 17/04* (2006.01)
*G06F 1/16* (2006.01)

(52) U.S. Cl.
CPC ............ *G06F 1/163* (2013.01); *A44C 5/0053* (2013.01); *G06F 1/1652* (2013.01); *G04G 17/045* (2013.01)

(58) Field of Classification Search
CPC ...... G06F 1/163; G06F 1/1652; G06F 1/1681; H05K 2201/051; G09F 9/301; G04G 17/08; G04G 17/045; A44C 5/0053
See application file for complete search history.

(56) References Cited

U.S. PATENT DOCUMENTS

| | | | | |
|---|---|---|---|---|
| 5,065,376 A | * | 11/1991 | Choulat | A44C 5/2076 368/282 |
| 5,418,760 A | * | 5/1995 | Kawashima | G02F 1/13306 368/69 |
| 5,515,247 A | * | 5/1996 | Cheung | A44C 5/0007 362/103 |
| 5,808,783 A | * | 9/1998 | Crowley | G09F 9/372 345/107 |

(Continued)

FOREIGN PATENT DOCUMENTS

| | | |
|---|---|---|
| CN | 103561606 A | 2/2014 |
| CN | 204104227 U | 1/2015 |

(Continued)

OTHER PUBLICATIONS

International Search Report dated Jan. 18, 2019 in corresponding International application No. PCT/CN2018/096732; 7 pgs.

*Primary Examiner* — Adrian S Wilson
(74) *Attorney, Agent, or Firm* — Maier & Maier, PLLC

(57) ABSTRACT

A wrist strap assembly includes a flexible wrist strap and a restricting mechanism. The restricting mechanism is used to limit the bending magnitude of the flexible wrist strap, and is disposed inside and fixed to the flexible wrist strap. A wrist device is further provided, the wrist device includes the wrist strap assembly and a flexible screen. The flexible screen is provided on the flexible wrist strap, and the restricting mechanism is disposed at one side of the flexible screen.

16 Claims, 4 Drawing Sheets

(56) References Cited

U.S. PATENT DOCUMENTS

| | | | | |
|---|---|---|---|---|
| 5,896,757 | A * | 4/1999 | Kharloubian | A44C 17/025 63/28 |
| 7,639,571 | B2 * | 12/2009 | Ishii | G04G 9/02 368/223 |
| 7,710,370 | B2 * | 5/2010 | Slikkerveer | G09F 9/35 345/31 |
| 7,787,097 | B2 * | 8/2010 | Satoh | G02F 1/133305 349/158 |
| 8,151,501 | B2 * | 4/2012 | Bemelmans | G06F 1/1601 40/603 |
| 9,205,598 | B2 * | 12/2015 | Heck | B29C 66/73366 |
| 9,400,521 | B2 * | 7/2016 | Heck | G04G 17/045 |
| 9,510,470 | B2 * | 11/2016 | Huitema | H05K 5/0017 |
| D778,768 | S * | 2/2017 | Curry | D11/93 |
| D778,769 | S * | 2/2017 | Inouye | D11/93 |
| D778,770 | S * | 2/2017 | Curry | D11/93 |
| 9,642,241 | B2 * | 5/2017 | Huitema | H01L 51/0097 |
| 9,720,443 | B2 * | 8/2017 | Malhotra | G06F 1/163 |
| 9,807,893 | B2 * | 10/2017 | Li | G06F 1/1652 |
| D807,350 | S * | 1/2018 | Inagaki | D14/344 |
| 10,146,261 | B2 * | 12/2018 | Hashimoto | G06F 1/163 |
| 2003/0026171 | A1 * | 2/2003 | Brewer | G02B 26/026 368/82 |
| 2007/0064542 | A1 * | 3/2007 | Fukushima | G04G 21/00 368/282 |
| 2007/0117600 | A1 * | 5/2007 | Robertson, Jr. | G06F 1/1681 455/575.3 |
| 2008/0291225 | A1 * | 11/2008 | Arneson | G06F 3/011 345/698 |
| 2009/0251888 | A1 * | 10/2009 | Douglas | A44C 5/0015 362/103 |
| 2010/0238612 | A1 | 9/2010 | Hsiao et al. | |
| 2011/0043976 | A1 * | 2/2011 | Visser | G09F 9/00 361/679.01 |
| 2011/0048619 | A1 * | 3/2011 | Meinders | H05K 3/4635 156/184 |
| 2011/0187681 | A1 * | 8/2011 | Kim | G06F 1/1652 345/204 |
| 2012/0122519 | A1 * | 5/2012 | Jochheim | H04B 1/385 455/556.1 |
| 2012/0314546 | A1 * | 12/2012 | Brewer | G04G 17/04 368/281 |
| 2014/0053602 | A1 * | 2/2014 | Catheline | A44C 5/0053 63/3 |
| 2015/0378391 | A1 * | 12/2015 | Huitema | H05K 1/189 361/679.03 |

FOREIGN PATENT DOCUMENTS

| | | |
|---|---|---|
| CN | 205067975 U | 3/2016 |
| CN | 105867541 A | 8/2016 |
| CN | 106030687 A | 10/2016 |
| CN | 106030688 A | 10/2016 |
| CN | 205696106 U | 11/2016 |

* cited by examiner

WRIST DEVICES AND WRIST STRAP ASSEMBLIES THEREOF

CROSS-REFERENCE TO RELATED APPLICATION

The application claims the benefit of priority of International Application No. PCT/CN2018/096732, filed on Jul. 24, 2018 and Chinese Patent Application No. 201820494730.5, filed on Apr. 9, 2018, and the entire disclosures of which are incorporated herein.

FIELD

The present disclosure relates to the field of flexibility technologies.

BACKGROUND

As the flexible display technology is becoming mature, wristwatches with flexible screens are receiving more and more attention in the market.

SUMMARY

The objective of the present disclosure is to provide a wrist device and a wrist strap assembly thereof. A restricting mechanism for controlling a bending radius of a flexible screen is wrapped in a flexible wrist strap, and thus the restricting mechanism becomes an invisible built-in part, and rendering the wrist strap attractive, light and thin.

One aspect of the present disclosure provides a wrist strap assembly, which includes:

a flexible wrist strap; and a restricting mechanism, the restricting mechanism restricting a bending magnitude of the flexible wrist strap and being disposed inside and fixed to the flexible wrist strap.

Preferably, the restricting mechanism and the flexible wrist strap are integrally formed into one piece.

Preferably, the restricting mechanism is U-shaped, the U shape faces having an opening facing a flexible wrist strap surface clinging to the wrist.

Preferably, the restricting mechanism includes:

a plurality of first connecting members; and a plurality of second connecting members alternately hinged to the first connecting members in sequence.

Preferably, the first connecting member has two ends that are respectively hinged to two ends of any adjacent second connecting member.

Preferably, in any adjacent first connecting member and second connecting member, one of the connecting members is provided with a restricting portion and the other one is provided with a blocking portion, the blocking portion and the restricting portion being arranged in a contactable manner to restrict a relative limit position of the two connecting members.

Preferably, the first connecting member has a length shorter than a length of the second connecting member, the two ends of the first connecting member respectively being hinged to the two ends of the second connecting member.

Preferably, each of a length direction of the first connecting members and a length direction of the second connecting members is perpendicular to a length direction of the restricting mechanism.

Preferably, each of the two ends of the first connecting member is respectively provided with one restricting portion, and two said restricting portions contact the blocking portion on a same second connecting member.

Preferably, the first connecting member includes a main body and two ends connected to the main body; a part of a structure of each end is bent and extends towards the outer side to form the restricting portion; an inner surface of the second connecting member forms the blocking portion; and a gap is reserved between each extension portion and the inner surface of an adjacent second connecting member in an initial position.

Preferably, each of the two ends of the first connecting member is provided with two restricting portions, the two restricting portions on a same end are oppositely arranged; each of the two ends of the second connecting member is provided with two connecting portions, the two connecting portions on a same end are oppositely arranged; and each end of the first connecting member is hinged to the connecting portion on a corresponding end of an adjacent second connecting member by the restricting portion.

Preferably, in any adjacent first connecting member and second connecting member, one side of one of the connecting members and one side of the other connecting member arranged in a contactable manner to limit a relative rotation direction of the two connecting members.

Preferably, the flexible wrist strap has an internal space, and a length of the restricting mechanism is smaller than or equal to a length of the internal space of the flexible wrist strap.

Another aspect of the present disclosure provides a wrist device, which includes the wrist strap assembly, and further includes:

a flexible screen, provided on the flexible wrist strap, a restricting mechanism being disposed at one side of the flexible screen.

Preferably, a length of the restricting mechanism is greater than or equal to a length of the flexible screen.

Preferably, the restricting mechanism limits a bending magnitude of the flexible wrist strap to be smaller than or equal to a maximum bending magnitude of the flexible screen.

The wrist device and the wrist strap assembly thereof provided by the present disclosure have the following advantages: the restricting mechanism is arranged inside the flexible wrist strap and wrapped by the flexible wrist strap such that the restricting mechanism becomes an invisible built-in part. Thus, the structure and shape of the restricting mechanism do not affect the exterior of the wrist device and the flexible wrist strap integrally forms an exterior part of the wrist device without a restricting design. Hence, the flexible wrist strap can be designed more attractively, and an aesthetic of the wrist device is improved.

Moreover, speaking from the structure, wrapped in the flexible wrist strap, the restricting mechanism is enhanced in strength and thus its intrinsic strength design can be weakened. Such that the restricting mechanism can be designed to be light and thin, and the weight of the wrist device can be reduced, thereby improving the user experience. In addition, after removal of the restricting design, the flexible wrist strap can be designed into a case with excellent water resistance, thus the water resistance of the wrist device is improved.

BRIEF DESCRIPTION OF THE DRAWINGS

The accompanying drawings are used to make the present disclosure more comprehensible, and do not constitute improper limitations to the present disclosure, wherein.

In the drawings.

1: flexible wrist strap; 2: flexible screen; 3: battery; 4: circuit board; 5: restricting mechanism; 51: first connecting member; 52: second connecting member; 511, 512: extension portion; 521, 522: connecting portion; and 523: inner surface

DETAILED DESCRIPTION

A flexible screen of the wristwatch is usually disposed on a flexible wrist strap which drives a shape deformation of the screen. However, unlimited bending of the flexible screen is impossible, and accordingly a corresponding limit bending radius is usually set. If exceeding the limit bending radius, the flexible screen is damaged due to an excessive bending.

A wrist device and a wrist strap assembly thereof provided by the present disclosure are further described in detail below with reference to the accompanying drawings and specific exemplary embodiments.

Unless clearly specified otherwise in the context, the singular forms "a", "an" and "the" used in the specification are also intended to include the plural forms. Unless clearly specified otherwise in the context, the term "or" used in the specification is usually used in the sense of including "and/or". The term "outer side" used in the specification generally refers to the direction away from the axis of the member.

Figure 1:
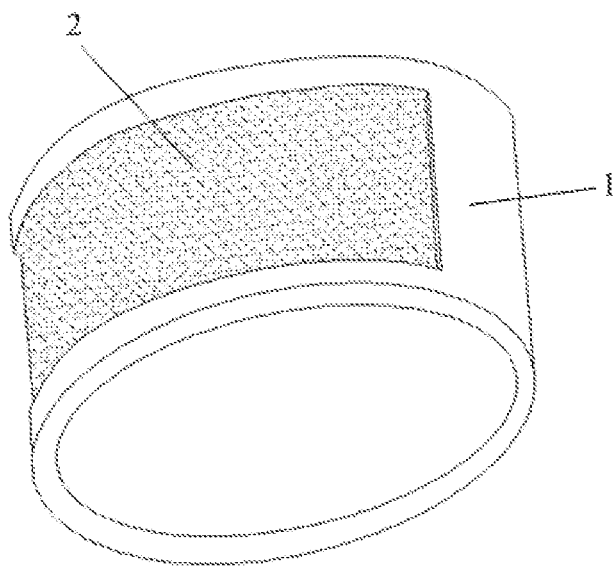
FIG. 1 illustrates the exterior of a wrist device in an exemplary embodiment of the present disclosure.
Figure 2:
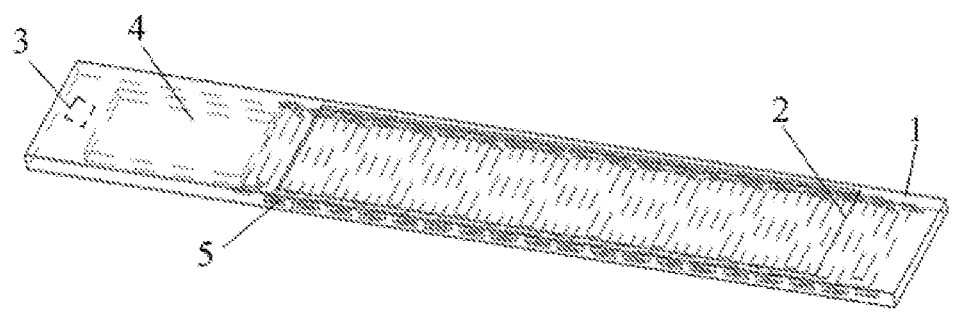
FIG. 2 is a schematic diagram of the wrist device in an exemplary embodiment of the present disclosure.

FIG. 1 illustrates an exterior of a wrist device in an exemplary embodiment of the present disclosure. FIG. 2 is a schematic diagram of the wrist device in an exemplary embodiment of the present disclosure, and dotted lines are used in FIG. 2 to show invisible components internally provided. As shown in FIG. 1 and FIG. 2, the wrist device includes a wrist strap assembly and a flexible screen 2. The wrist strap assembly includes a flexible wrist strap 1 and a restricting mechanism 5, and the flexible screen 2 is provided on the flexible wrist strap 1. Preferably, the flexible screen 2 is flush with the flexible wrist strap 1 (that is, the flexible screen 2 is embedded into the flexible wrist strap 1 by its entire thickness).

In the present disclosure, the flexible wrist strap 1 wholly forms a case of the wrist device, which may be an integrated or separated case structure. The flexible wrist strap 1 may be a continuous ring shape structure (as shown in FIG. 1), or a segmented strip shape structure (as shown in FIG. 2). For the strip shape structure, the opposite two ends of the flexible wrist strap 1 may be fastened by using a clasp, or by magnetic attraction, or by other known manners. Referring to FIG. 2 continuously, a restricting mechanism 5 is provided inside and fixed to the flexible wrist strap 1 so as to conveniently control the bending magnitude of the flexible wrist strap 1 and to finally control the bending radius of the flexible screen 2. Herein, as long as the restricting mechanism 5 is able to control the bending magnitude of the flexible wrist strap 1, the present disclosure does not particularly limit the structure of the restricting mechanism.

Therefore, in the wrist device in this exemplary embodiment, the restricting mechanism 5 is arranged inside the flexible wrist strap 1 and wrapped by the flexible wrist strap 1, such that the restricting mechanism 5 becomes an invisible built-in part. Thus, the structure and shape of the restricting mechanism 5 do not affect the exterior of the wrist device, and the flexible wrist strap 1 integrally forms an exterior part of the wrist device without a restricting design. As a result, the flexible wrist strap 1 can be designed more attractively, and an aesthetic of the wrist device may be improved.

Speaking from the structure, the restricting mechanism 5 wrapped by the flexible wrist strap 1 is enhanced in strength and thus its intrinsic strength design can be weakened such that the restricting mechanism 5 can be designed to be light and thin, and the weight of the wrist device can be reduced, thereby improving the user experience. In addition, after removal of the restricting design, the flexible wrist strap 1 can be designed into a case with an excellent water resistance so as to improve the water resistance of the wrist device.

In this exemplary embodiment, the flexible wrist strap 1 may be made from a soft and flexible material, such as silicone, rubber, TPU, etc., to achieve a foldable and bendable effect and its hardness may range from 30 HA to 70 HA. However, the present disclosure is not limited thereto. The flexible wrist strap 1 may also be made by using metal sheets which may be made from stainless steel, and is also foldable and bendable. In a non-restrictive fabrication method, an extrusion or injection mould may be first provided, the restricting mechanism 5 is then placed into the extrusion or injection mould and fixed therein, and afterwards, a corresponding forming material (namely, a forming material of the flexible wrist strap 1, which is not limited to silicone, rubber, and TPU) is added into the mould, to form the flexible wrist strap 1. During the forming procedure, the restricting mechanism 5 is wrapped by the flexible wrist strap 1. Specifically speaking, before formation of the flexible wrist strap 1, first the restricting mechanism 5 is fixed in the mould, and then a liquid or semisolid forming material is added into the mould so as to obtain the flexible wrist strap 1 with a fixedly built-in restricting mechanism 5. Therefore, in this exemplary embodiment, the restricting mechanism 5 and the flexible wrist strap 1 are preferably integrally formed. As such, it is not required to additionally assemble the restricting mechanism 5 and the flexible wrist strap 1 together, so that the assembly procedure of the whole product is simplified and the production cost is reduced.

In this exemplary embodiment, the wrist device may also include a functional assembly which may include a battery 3 and a circuit board 4. The battery 3 is used for supplying power for the whole or part of the wrist device, which may be a common battery (unbendable) or a flexible battery (bendable). The circuit board 4 is the core of the wrist device, constitutes the circuit structure of the whole wrist device and is connected to the flexible screen 2. The circuit board 4 may be a common rigid circuit board (unbendable), or a flexible circuit board (bendable).

Further, the circuit board 4 may be disposed at one side, such as the left side or the right side, of the flexible screen 2. The circuit board 4 and the battery 3 may be arranged side by side. To reduce the thickness of the product, preferably, each of the circuit board 4, the battery 3, and other functional assembly, may be disposed in a gap of the restricting mechanism 5 and fixed to the flexible wrist strap 1.

The flexible wrist strap 1 includes a front side and a back side that are opposite arranged. The back side clings to the wrist. One or more auxiliary holes (not shown in the figure) are opened on the back side of the flexible wrist strap 1, through which the functional assembly, such as the battery 3 and the circuit board 4, is placed into the flexible wrist strap 1. Alternatively, before disposition of the flexible screen 2, the functional assembly, such as the battery 3 and the circuit board 4, is placed into the flexible wrist strap 1 in advance through a window on the front side of the flexible wrist strap 1. Herein, the window is used for the flexible screen 2 to be placed in, and the shape of the window matches the shape of the flexible screen 2.

In this exemplary embodiment, the restricting mechanism 5 is disposed beneath (namely, on the back side) the flexible screen 2. The restricting mechanism 5 longitudinally extends along the length direction of the flexible screen 2, and the length of the restricting mechanism 5 is preferably greater than or equal to the length of the flexible screen 2. As such, the restricting mechanism 5 can limit the bending magnitude of the flexible wrist strap 1 within a safety region of the flexible screen 2, and simultaneously control the bending radius of the flexible screen 2 mounted in this region.

In a recommended solution, the length of the restricting mechanism 5 is greater than the length of the flexible screen 2, and is smaller than or equal to the length of internal space of the flexible wrist strap 1. Herein, the restricting mechanism 5 and the flexible wrist strap 1 are also consistent in the length direction. When the length of the restricting mechanism 5 is equal to the length of the internal space of the flexible wrist strap 1, the restricting mechanism 5 can be used to limit the bending magnitude of the whole region of the flexible wrist strap 1, thus both the flexible screen 2 and the functional assembly are protected. For example, the battery 3 and the circuit board 4 can be prevented from becoming loose during bending of the wrist strap, the loose of an FPC connecting member because of pulling and dragging during lateral bending of the flexible wrist strap 1 can be prevented. In this exemplary embodiment, one end of the restricting mechanism 5 may coincide with the right side of the flexible screen 2, and the other end thereof extends beyond the left side of the flexible screen 2 and may further extend to an inner wall of the flexible wrist strap 1.

Figure 3A:
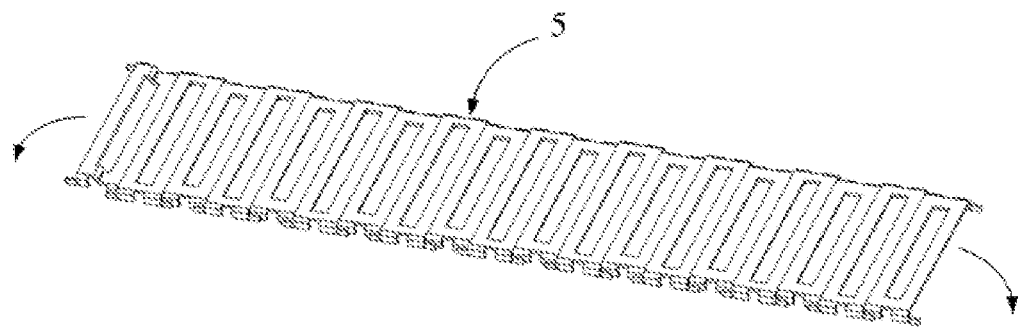
FIG. 3a is a schematic diagram of an overall structure of a restricting mechanism which is not folded in an exemplary embodiment of the present disclosure.
Figure 3B:
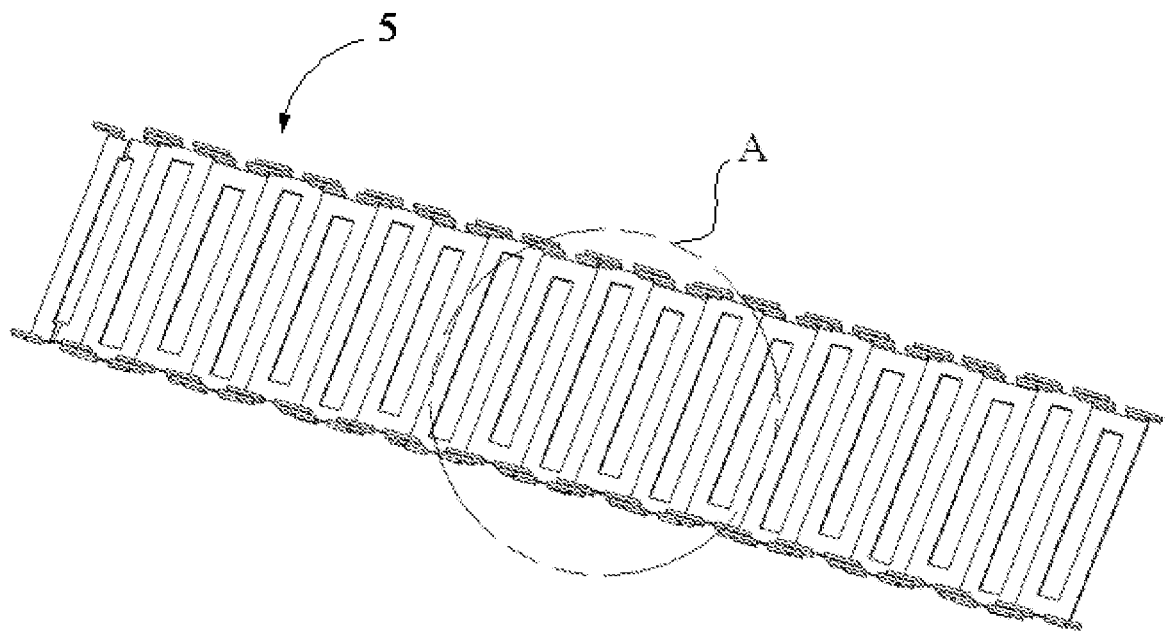
FIG. 3b is a schematic diagram of an overall structure of the restricting mechanism shown in FIG. 3a after it is turned upside down by 180°.

FIG. 3a is a schematic diagram of an overall structure of the restricting mechanism which is not folded in an exemplary embodiment of the present disclosure, and FIG. 3b is a schematic diagram of an overall structure of the restricting mechanism shown in FIG. 3a after it is turned upside down by 180°. As shown in FIGS. 3a and 3b, the restricting mechanism 5 can be bent in a direction shown by the arrows, and the bending direction is an operation direction in which the flexible wrist strap 1 is worn around the wrist. In this exemplary embodiment, the restricting mechanism 5 is U-shaped on the whole, and its opening faces the back side of the flexible wrist strap 1 (namely, the surface, of the flexible wrist strap, which clings to the wrist).

Figure 3C:
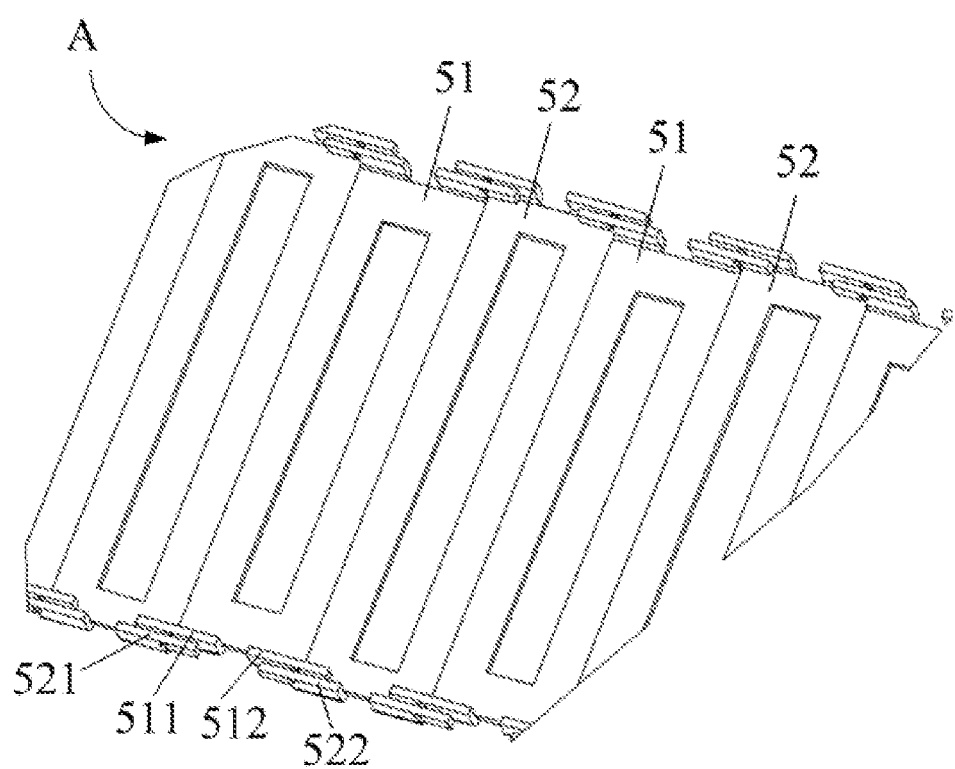
FIG. 3c is a partial enlarged diagram of the restricting mechanism shown in FIG. 3b.

FIG. 3c is a partial enlarged diagram of the restricting mechanism shown in FIG. 3b. As shown in FIG. 3c, the restricting mechanism 5 includes a plurality of first connecting members 51 and a plurality of second connecting members 52. These first connecting members 51 and second connecting members 52 are alternately connected in sequence, and the adjacent first connecting member 51 and second connecting member 52 are hinged. Specifically, the two ends of each first connecting member 51 are respectively hinged to the two ends of its adjacent second connecting members 52. Each connecting member is designed into a U-shaped structure, and thus the restricting mechanism 5 is U-shaped on the whole.

In this exemplary embodiment, the first connecting member 51 is shorter than the second connecting member 52. The length directions of these connecting members are perpendicular to the length direction of the restricting mechanism 5, that is, a transverse direction of the restricting mechanism 5 extends along the length directions of the connecting members. Therefore, each first connecting member 51 may be hinged to an inner side of its adjacent second connecting member 52, and further they can be restricted by each other in this manner.

In addition, to control a maximum rotation angle between the two connecting members which are hinged together, in this exemplary embodiment, a restricting portion is disposed on the first connecting member 51 and a blocking portion is disposed on the second connecting member 52, and the blocking portion and the restricting portion are arranged in a contactable manner. Specifically, during relative rotation between the first connecting member 51 and the second connecting member 52, once the restricting portion and the blocking portion contact each other, the first connecting member 51 and the second connecting member 52 halt and are unable to rotate further, thus restricting the relatively maximum rotation angle between the two connecting members. Because the restricting mechanism 5 is fixed to the flexible wrist strap 1, the bending of the flexible wrist strap 1 is also restricted in this case, and further the bending radius of the flexible screen 2 is restricted accordingly.

In this exemplary embodiment, the first connecting member 51 includes a main body and two ends connected to the main body. A part of the structure of each end is bent and extends towards the outer side of the main body to form an extension portion 511. The two extension portions 511 are used to contact the blocking portion on the same second connecting member 52, thus restricting the relatively maximum rotation angle between the two connecting members. Therefore, the extension portions 511 form the restricting portions of this exemplary embodiment. Preferably, an inner surface 523 (namely, an inner bottom face of the opening of the U shape) of the second connecting member 52 forms the blocking portion. In an initial position (that is, when the first connecting member 51 and the second connecting member 52 have not yet moved relative to each other), a gap is reserved between each extension portion 511 and the inner surface 523. The size of the gap directly determines the rotation angle. Therefore, the value of the gap may be set according to actual requirements so as to control the relatively maximum relative angle. Herein, when the adjacent first connecting member 51 and second connecting member 52 have not yet rotated relative to each other, a gap is reserved between each extension portion 511 on the first connecting member 51 and the inner surface 523 of the second connecting member 52 so that the extension portion 511 on the first connecting member 51 and the corresponding inner surface 523 to be pressed against are arranged in a contactable manner.

Likewise, to control the maximum rotation angle between each first connecting member 51 and its adjacent second connecting member 52 on the other side, each of the two ends of the first connecting member 51 is provided with two extension portions 511 and 512. The two extension portions 511 and 512 are opposite arranged and have opposite extension directions with the extension directions being roughly perpendicular to the transverse direction of the restricting mechanism 5. In this manner, each of the two ends of the first connecting member 51 contacts the inner surface 523 of its adjacent second connecting member 52 on one side by the extension portion 511, and also contacts the inner surface 523 of its adjacent second connecting member 52 on the other side by the extension portion 512 so that relative rotation and mutual restricting are realized.

Further, each of the two ends of the second connecting member 52 is provided with two connecting portions 521 and 522. The two connecting portions 521 and 522 on the same end are opposite arranged, so that each end of the second connecting member 52 is hinged to the first connecting member 51 by one of the connecting portions. Further, the connecting portions on the second connecting member 52 are hinged to the extension portions on the first connecting member 51. Specifically, each end of the second connecting member 52 is hinged to the extension portion 511 on the corresponding end of its adjacent first connecting member 51 on one side by the connecting portion 521, and is further hinged to the extension portion 512 on the corresponding end of its adjacent first connecting member 51 on the other side by the connecting portion 522. In a recommended solution, the connecting portions 521 and 522 may also be formed by bending and outward extending a part of the structure of each end of the second connecting member 52.

Figure 3D:
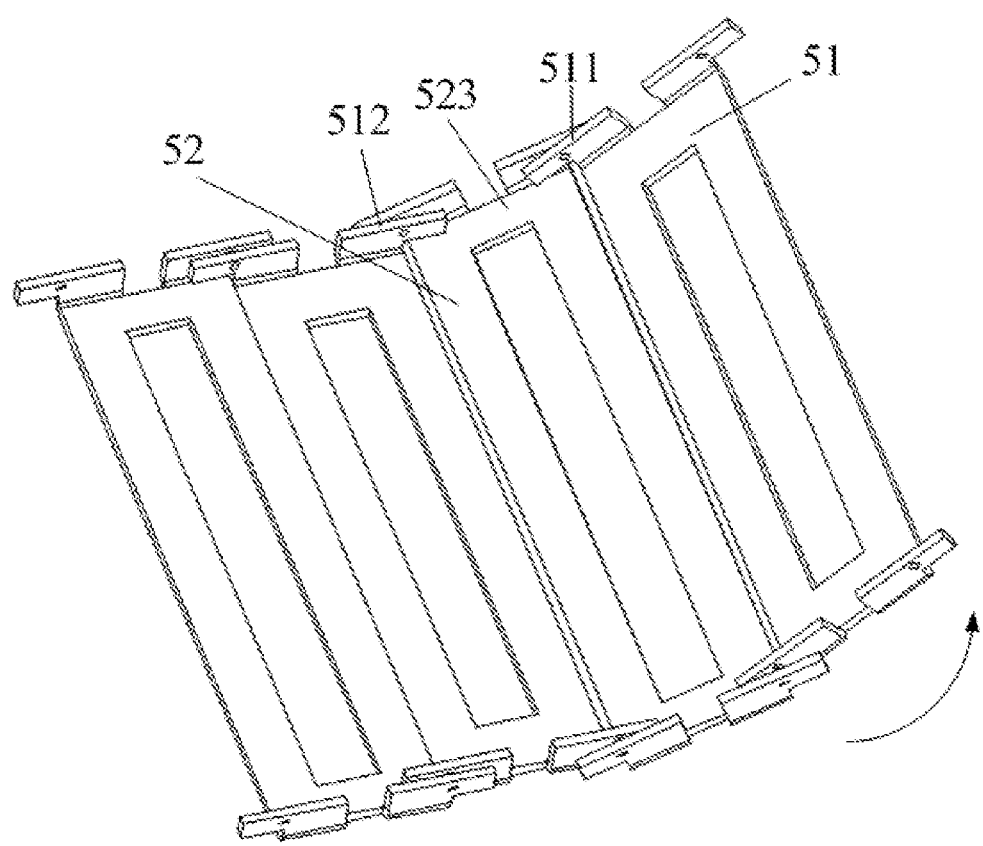
FIG. 3d is a schematic structural diagram of the restricting mechanism which is partially bent in an exemplary embodiment of the present disclosure.

FIG. 3d is a schematic diagram of the restricting mechanism which is partially bent in an exemplary embodiment of the present disclosure. As shown in FIG. 3d, during upward rotation in the direction shown by the arrow, once the extension portions 511 on the first connecting member 51 contact the inner surface 523 of its adjacent second connecting member 52 on one side, the two connecting members are unable to further rotate upwards so that the relatively maximum rotation angle is restricted. Because all the connecting members are mutually hinged and restricted in the same manner, limit positions of any two adjacent connecting members are restricted in this manner, thereby controlling the bending of the flexible wrist strap 1.

Further, to prevent the flexible wrist strap 1 from being bent in an abnormal operation direction, the restricting mechanism 5 further has a function of restricting a bending direction. In a preferred operation, one side of the first connecting member 51 is able to contact one side of its adjacent second connecting member 52 to limit a rotation direction of the hinged first connecting member 51 and second connecting member 52. That is, in this manner, the flexible wrist strap can only be bent in a normal wearing direction. In this exemplary embodiment, when the sides of the first connecting member 51 and the second connecting member 52 are contacted, the relative rotation angle therebetween is zero degree, that is, the two connecting members have not yet moved relative to each other. Further, to reduce the thickness, the plurality of first connecting members 51 and the plurality of second connecting members 52 are aligned. Further, the first connecting members 51 and the second connecting members 52 may all be made by sheets. The thickness of the sheets may be controlled in a range from 0.2 mm to 1.0 mm, and the material of the sheets may be engineering plastic or carbon fiber.

However, in addition to the foregoing exemplary embodiment, as long as one of the adjacent first connecting member 51 and second connecting member 52 is provided with a restricting portion and the other one is provided with a blocking portion able to contact the restricting portion, the present disclosure does not particularly limit the structure for restricting the limit positions of the two adjacent connecting members. Moreover, a way of controlling the bending direction of the restricting mechanism is not restricted to the contact manner between the sides of two connecting members, and thus other structures able to control the bending direction also fall within the protection scope of the present disclosure.

Finally, it should be noted that, the wrist device provided by this exemplary embodiment includes, but is not limited to, a wristwatch, a mobile phone, and a computer; and may also include electronic equipment for health management, such as a sphygmomanometer, a pedometer and the like.

To sum up, in the wrist device and the wrist strap assembly thereof provided by the exemplary embodiments of the present disclosure, the restricting mechanism 5 is arranged inside the flexible wrist strap 1 and wrapped by the flexible wrist strap 1, such that the restricting mechanism 5 becomes an invisible built-in part. Thus, the structure and shape of the restricting mechanism 5 do not affect the exterior of the wrist device, and the flexible wrist strap 1 integrally forms an exterior part of the wrist device without a restricting design. Hence, the flexible wrist strap 1 can be designed more attractively, and an aesthetic of the wrist device is improved. Moreover, speaking from the structure, wrapped by the flexible wrist strap 1, the restricting mechanism 5 is enhanced in strength and thus its intrinsic strength design can be weakened such that the restricting mechanism 5 can be designed to be light and thin, and the weight of the wrist device can be reduced, thereby improving the user experience. In addition, after removal of the restricting design, the flexible wrist strap 1 can be designed into a case with an excellent water resistance, thus the water resistance of the wrist device is improved.

The above merely describes preferred exemplary embodiments of the present disclosure, and is not intended to limit the scope of the present disclosure. Any replacements and modifications made by persons of ordinary skill in the art according to the disclosed content should all fall within the protection scope of the appended claims.

What is claimed is:

1. A wrist strap assembly, comprising:
 a flexible wrist strap; and
 a restricting mechanism, the restricting mechanism restricting a bending magnitude of the flexible wrist strap and being disposed inside and fixed to the flexible wrist strap;
 wherein the restricting mechanism is U-shaped and the U shape has an opening facing a flexible wrist strap surface clinging to a wrist;
 the restricting mechanism comprises a plurality of first connecting members, and a plurality of second connecting members alternately hinged to the first connecting members in sequence;
 wherein each of the plurality of first connecting members comprises a main body and two ends connected to the main body; a part of a structure of each end is bent and extends towards an outer side to form a restricting portion; an inner surface of each of the plurality of second connecting members forms a blocking portion;
 wherein two restricting portions of one first connecting member are contactable with the blocking portion of an adjacent second connecting member to restrict a relative limit position of the first and second connecting members; and wherein a gap is reserved between any restricting portion of one first connecting member and the inner surface of an adjacent second connecting member in an initial position.

2. The wrist strap assembly of claim 1, wherein the restricting mechanism and the flexible wrist strap are integrally formed into one piece.

3. The wrist strap assembly of claim 1, wherein the two ends of the first connecting member are respectively hinged to two ends of any adjacent second connecting member.

4. The wrist strap assembly of claim 3, wherein the first connecting member has a length shorter than a length of the second connecting member, the two ends of the first connecting member respectively being hinged to the two ends of the second connecting member.

5. The wrist strap assembly of claim 4, wherein each of a length direction of the first connecting member and a length direction of the second connecting member is perpendicular to a length direction of the restricting mechanism.

6. A wrist strap assembly, comprising:
a flexible wrist strap; and
a restricting mechanism, the restricting mechanism restricting a bending magnitude of the flexible wrist strap and being disposed inside and fixed to the flexible wrist strap;
wherein the restricting mechanism is U-shaped, and the U shape has an opening facing a flexible wrist strap surface clinging to a wrist;
wherein the restricting mechanism comprises a plurality of first connecting members, and a plurality of second connecting members alternately hinged to the first connecting members in sequence;
wherein each of the two ends of the first connecting member is provided with two restricting portions, the two restricting portions on a same end are oppositely arranged, an adjacent second connecting member is provided with a blocking portion, and the blocking portion and the restricting portions are arranged in a contactable manner to restrict a relative limit position of the first and second connecting members;
wherein each of two ends of the second connecting member is provided with two connecting portions, the two connecting portions on a same end are oppositely arranged; and
wherein each end of the first connecting member is hinged to the connecting portion on a corresponding end of an adjacent second connecting member by the restricting portion.

7. The wrist strap assembly of claim 6, wherein in any adjacent first connecting member and second connecting member, one side of one of the connecting members and one side of the other connecting member arranged in a contactable manner so as to limit a relative rotation direction of the two connecting members.

8. The wrist strap assembly of claim 6, wherein the flexible wrist strap has an internal space, and a length of the restricting mechanism is smaller than or equal to a length of the internal space of the flexible wrist strap.

9. A wrist device, comprising the wrist strap assembly described in claim 6, and further comprising:
a flexible screen, provided on a flexible wrist strap,
the restricting mechanism being disposed at one side of the flexible screen.

10. The wrist device of claim 9, wherein a length of the restricting mechanism is greater than or equal to a length of the flexible screen.

11. The wrist device of claim 9, wherein the restricting mechanism limits a bending magnitude of the flexible wrist strap to be smaller than or equal to a maximum bending magnitude of the flexible screen.

12. The wrist strap assembly of claim 6, wherein the restricting mechanism and the flexible wrist strap are integrally formed into one piece.

13. The wrist strap assembly of claim 12, wherein the first connecting member has a length shorter than a length of the second connecting member.

14. The wrist strap assembly of claim 13, wherein each of a length direction of the first connecting member and a length direction of the second connecting member is perpendicular to a length direction of the restricting mechanism.

15. The wrist strap assembly of claim 6, wherein in any adjacent first connecting member and second connecting member, one side of one of the connecting members and one side of the other connecting member arranged in a contactable manner so as to limit a relative rotation direction of the two connecting members.

16. The wrist strap assembly of claim 6, wherein the flexible wrist strap has an internal space, and a length of the restricting mechanism is smaller than or equal to a length of the internal space of the flexible wrist strap.

* * * * *